United States Patent
Braun et al.

(10) Patent No.: US 6,812,604 B2
(45) Date of Patent: Nov. 2, 2004

(54) RECTIFIER ASSEMBLY HAVING HEAT-DISSIPATING STRUCTURE FOR AN ALTERNATOR

(75) Inventors: Horst Braun, Stuttgart (DE); Holger Scholzen, Stuttgart (DE); Peter Urbach, Reutlingen (DE); Holger Haussmann, Metzingen (DE); Dana Keppeler, Immenstaad (DE); Thomas Bilsing, Boennigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/250,744

(22) PCT Filed: Oct. 15, 2002

(86) PCT No.: PCT/DE02/03884

§ 371 (c)(1),
(2), (4) Date: Oct. 27, 2003

(87) PCT Pub. No.: WO03/041243

PCT Pub. Date: May 15, 2003

(65) Prior Publication Data
US 2004/0100808 A1 May 27, 2004

(30) Foreign Application Priority Data
Nov. 8, 2001 (DE) .......................................... 101 54 866

(51) Int. Cl.⁷ ............................................... H02K 11/00
(52) U.S. Cl. ..................... 310/68 D; 310/67 R; 310/52; 310/58; 310/59; 310/64; 310/68 R
(58) Field of Search .............................. 310/68 D, 68 R, 310/52, 58, 89, 67 R, 59

(56) References Cited

U.S. PATENT DOCUMENTS

| | | | | |
|---|---|---|---|---|
| 3,812,390 A | * | 5/1974 | Richards | 310/68 D |
| 4,492,885 A | * | 1/1985 | Kitamura et al. | 310/62 |
| 4,604,538 A | * | 8/1986 | Merrill et al. | 310/68 D |
| 4,606,000 A | | 8/1986 | Steele et al. | 310/68 D |
| 5,659,212 A | * | 8/1997 | DePetris | 310/68 D |
| 5,729,063 A | | 3/1998 | Adachi et al. | 310/68 D |
| 5,838,544 A | * | 11/1998 | Wei | 310/68 D |
| 5,892,676 A | * | 4/1999 | Hsieh | 363/141 |
| 6,081,054 A | * | 6/2000 | Kashihara et al. | 310/68 D |
| 6,184,602 B1 | * | 2/2001 | Ooiwa et al. | 310/68 D |
| 6,275,404 B1 | * | 8/2001 | Shichijyo et al. | 310/68 D |
| 6,327,128 B1 | * | 12/2001 | De Petris | 361/103 |
| 6,522,045 B2 | * | 2/2003 | Ikeda et al. | 310/263 |
| 6,538,352 B2 | * | 3/2003 | Asao | 310/68 D |
| 6,577,032 B2 | * | 6/2003 | Irie | 310/68 D |

FOREIGN PATENT DOCUMENTS

| | | | | |
|---|---|---|---|---|
| EP | 0 125 834 | | 11/1984 | H02K/9/06 |
| FR | 2 803 132 | | 12/1999 | H02K/9/00 |
| GB | 2015252 A | * | 9/1979 | H01L/25/10 |

* cited by examiner

Primary Examiner—Karl Tamai
Assistant Examiner—Yahveh Comas
(74) Attorney, Agent, or Firm—Michael J. Striker

(57) ABSTRACT

The invention relates to an electrical machine, preferably an alternator (10) for motor vehicles, comprising a rectifier assembly (11a) that is fixed to an end shield (23) of the machine. Said rectifier assembly is cooled by a fan (27) that operates in the end shield (23), the diodes being positioned on a negative connecting plate (15) and a positive connecting plate (17) of the rectifier assembly (11). The aim of the invention is to evacuate the dissipated heat from the rectifier assembly (11a) in an advantageous manner. To achieve this, the rectifier assembly is located in an opening in the front face (32) of the end shield (23) and is connected in an electrically and thermally conductive manner by one of its two connecting plates (15 and 17) to a cooling body (33), which is connected to the exterior of the end shield (23) and covers the opening (32). The cooling air that is thus taken in by the fan (27) first flows from the exterior across the cooling body (33) in a radial manner towards the interior, entering the machine in the vicinity of the shaft through orifices (30) in the end shield (23) and from here, having reached the fan (27), subsequently flows past the other connecting plate (15 and 17) in a radial manner towards the exterior.

19 Claims, 4 Drawing Sheets

RECTIFIER ASSEMBLY HAVING HEAT-DISSIPATING STRUCTURE FOR AN ALTERNATOR

BACKGROUND OF THE INVENTION

The invention relates to an electrical machine, preferably an alternator for motor vehicles, comprising a rectifier assembly according to the preamble of claim 1.

In the case of alternators for motor vehicles, a rectifier assembly is usually located on the rear end face of the alternator that is driven by the motor vehicle, which said rectifier assembly rectifies the three-phase alternating voltage generated in the stator winding of the alternator to charge a storage battery in the electrical system of the motor vehicle. The rectifier bridge circuit of the assembly is composed of a plurality of diode bridges, each having a positive diode and a negative diode connected in series. The negative diodes are fixed to and contacted with a common negative connecting plate on the anode side, and the positive diodes are fixed to and contacted with a common positive connecting plate on the cathode side, said negative and positive connecting plates being configured as negative and positive cooling bodies, respectively. Each of the free winding terminations of the diodes is connected to the individual diode bridges via an additional circuit connection, and each one is connected on the input side with a phase connection of the stator winding.

A means of attaining the object of the invention is made known in U.S. Pat. No. 4,606,000, in which the negative and positive connecting plates lie on top of one another, insulated, in the manner of a sandwich, and they are fixed to the front face of the rear end shield of the alternator. The cooling bodies are displaced relative to each other in the region of their diodes in such a manner that the diode connections for establishing the circuit connections are accessible from the exterior. To evacuate the dissipated heat in the rectifier assembly, the two cooling bodies are expanded to cover a large area, with the negative cooling body resting on the end shield, and the dissipated heat from the negative diodes being given off to the end shield of the machine by thermal conduction. The dissipated heat from the positive diodes is given off to the cooling air that flows through the machine there, said dissipated heat being given off substantially via the positive cooling body in a region of the cooling body equipped with ventilation slots.

The known means for attaining the object of the invention have the disadvantage that, by configuring the connecting plates as cooling bodies, the rectifier assembly has relatively large dimensions, so that only a minimal degree of freedom remains for attaching the rectifier assembly on the front face of the rear end shield. Furthermore, the end shield of the machine must be fabricated out of material having good thermal conduction properties, since a majority of the dissipated heat is first directed by means of thermal conduction to the end shield, where it is carried out by the stream of cooling air from the rear fan of the machine by means of radiation and convection. Additionally, the relatively great masses of the cooling bodies pose a risk; namely that, if vibrations or jarring occurs between the rectifier parts and between them and the end shield, small relative motions can set in that can result in interruptions in the rectifier bridge circuit.

The aim of the means provided by the present invention is to evacuate the dissipated heat from the rectifier assembly to the cooling air of the machine in the most efficient manner possible, in order to keep the dimensions of the rectifier assembly as small as possible.

ADVANTAGES OF THE INVENTION

In contrast to the prior art, the electrical machine according to the invention having the characterizing features of claim 1 has the advantage that the dissipated heat from the rectifier assembly is substantially taken up by the cooling air drawn in by the fan of the machine before it is heated further by the dissipated heat from the machine. By efficiently cooling the rectifier assembly, the dimensions of said rectifier assembly can be reduced, resulting in greater degrees of freedom when it comes to attaching the rectifier assembly to the end shield. The dissipated heat from the front connecting plate of the rectifier assembly is evacuated by a cooling body to the cooling air flowing into the end shield in the vicinity of the shaft. A further advantage lies in the fact that, due to the small dimensions of the rectifier assembly, said rectifier assembly can be inserted in a window in the end shield, so that its rear connecting plate extends to a point where it is situated close in front of the vanes of the rear fan of the machine, so that, from there, it can give off the dissipated heat to the cooling air flowing radially outwardly with strong force.

The measures listed in the dependent claims result in advantageous further developments and improvements of the features indicated in the main claim. For example, to attain small dimensions of the rectifier assembly, said rectifier assembly is combined in a bridge circuit to form a compact diode module by the fact that the negative and positive diodes of each diode bridge are composed of semiconductor substrates that, together with a connecting piece inserted therebetween, forms a stack that is located between a positive connecting plate and a negative connecting plate. As a result, the additional components typically required to connect diode bridges are eliminated. In an advantageous further development, the stacks between the two connecting plates are arranged adjacent to each other, and their connecting pieces extend adjacently outward on a longitudinal side of the diode module for connection to the stator winding. There, the ends of the stator windings can be connected directly, so that the additional circuit connections required until now can be eliminated, especially since these circuit connections were usually embedded in plastic; this poses a potential fire hazard if short circuits occur. In order to enable the easiest possible connection of the stator winding from the exterior after the rectifier assembly is installed, the connecting pieces are angled on the longitudinal side of the diode module in such a manner that their end sections extend outwardly in a recess of the cooling body for connection of the stator winding.

To attain an even distribution of the heat dissipated from the diode module to the cooling body, the invention provides that said cooling body is configured semicircular in shape and is screwed into a fixed position from the exterior on the front face of the end shield. To enable good evacuation of dissipated heat from the cooling body to the cooling air of the machine, said cooling body is equipped in advantageous fashion with adjacently arranged, radially extending cooling fins on its exterior side furthest from the diode module. In order direct the cooling air drawn in by the fan of the machine radially from the exterior to the inside past the cooling body before it enters the orifices of the end shield, air intake openings are provided in the vicinity of the shaft in the protective cap known per se that covers the front face of the end shield, said air intake openings preferably being distributed around the entire circumference of the protective cap, but that are at least arranged above the cooling body.

When the stator winding is connected directly to the connecting pieces of the diode module, the star connections are located on the rear winding head of the machine, when a star connection is involved. As an alternative, the invention provides that the stator winding and the connecting pieces of the diode module are interconnected via an electrical connector containing the corresponding connecting conductors. The advantage of this is that the star connection of the stator winding can also be moved away from the winding head into electrical connector, especially since the neutral point is then connected in simple fashion via a further diode bridge of the diode module to utilize the harmonic waves of the voltage generated in the stator winding. In order to attach the electrical connector to the front face of the end shield in a manner that allows it to be as protected and vibration-resistant as possible, the invention provides that it is inserted between the cooling body and the end shield.

The cooling body is attached to either the positive connecting plate or the negative connecting plate, that is, it is screwed on, welded on, or riveted on. In the first case, the rectifier assembly is fixed to the cooling body in two dimensions by the outside of its positive connecting plate, and the cooling body is equipped with a positive terminal for connection to the vehicle electrical system battery of the motor vehicle. The cooling body with an electrically insulating intermediate layer is fixed to the end shield that carries the ground potential of the vehicle electrical system. In an advantageous further development, a thermally conductive material, e.g., high-alumina ceramics, is used for the electrically insulating intermediate layer, so that part of the heat dissipated from the cooling body can also be evacuated to the end shield as an additional heat sink. To attach the cooling body to the end shield, mounting holes are advantageously provided in the cooling body, into which insulating sleeves are inserted that accommodate the fastening screws of the cooling body. In order to connect the negative connection of the rectifier assembly to ground potential in this exemplary embodiment, the outside of the negative connecting plate is advantageously connected with a bus bar in two dimensions, which said bus bar, as ground connection, extends across the opening on the inside of the end shield and is fixed to the end shield by its ends.

In the alternative exemplary embodiment, the rectifier assembly is connected in two dimensions to the cooling body by the outside of its negative connecting plate, said cooling body, in turn, being fixed to the end shield representing the ground potential in an electrically and thermally conductive manner. A stronger evacuation of the dissipated heat from the cooling body to the end shield as additional heat sink can be attained in advantageous fashion by the fact that the cooling body rests against the end shield in two dimensions, preferably over an electrically and thermally conductive intermediate layer. A paste, an adhesive, or a wax, among other things, can be used as thermally conductive intermediate layer.

To save components, the cooling body can also be an integral part of the positive and/or negative connecting plates.

The exposed connecting plate furthest from the cooling body can be cooled intensively by ensuring that its outside at least nearly coincides with the inside of the end shield in the region of the opening in the front face.

SUMMARY OF THE DRAWINGS

The invention is explained in greater detail hereinbelow with reference to the figures.

DESCRIPTION OF THE PREFERRED EMBODIMENTS

Figure 1:
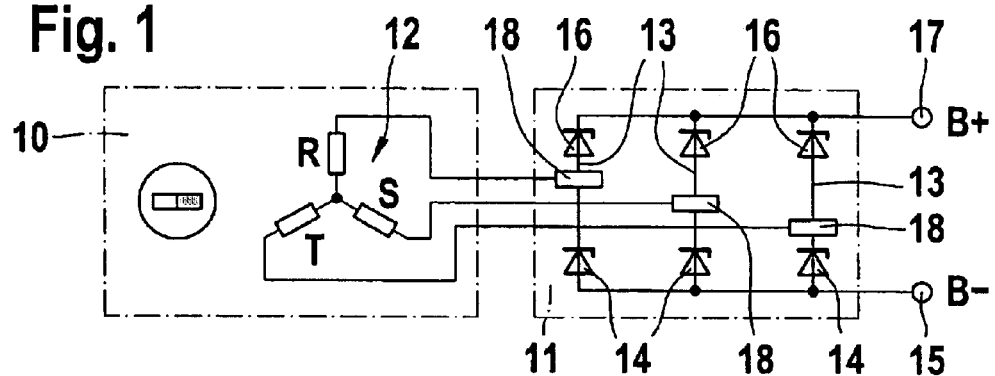
FIG. 1 shows the connection scheme of an alternator for motor vehicles, comprising a rectifier assembly.

The connection scheme of an alternator labelled with numeral 10 and a rectifier assembly 11 connected therewith on the input side are shown in FIG. 1. The alternator 10 that is driven by the engine of the motor vehicle has a stator winding 12 connected in the shape of a star, with phase conductors R, S and T. In the rectifier assembly 11, three diode bridges 13—each composed of two diodes connected in series—are connected in parallel to form a bridge circuit. The negative diodes 14 of the diode bridges 13 are connected on the anode side with a common negative pole 15, and the positive diodes 16 are connected on the cathode side with a common positive pole 17, whereby the negative pole and the positive pole form the direct-current output of the alternator to supply a storage battery in the electrical system of the motor vehicle. A connecting piece 18 is inserted between the negative diode 14 and the positive diode 16 of each diode bridge 13. An end of each phase conductor R, S, T of the stator winding 12 is connected to the connecting pieces 18 forming the input of the rectifier assembly 11.

Figure 2A:
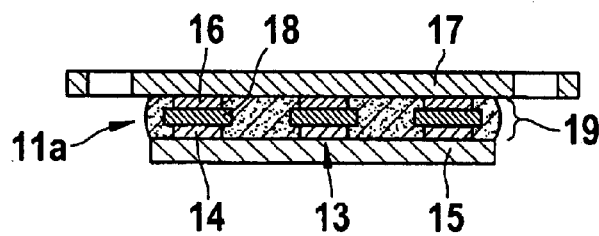
FIG. 2 is an enlarged view of the rectifier assembly as diode module shown a) as a longitudinal sectional drawing b) as a side view.
Figure 2B:
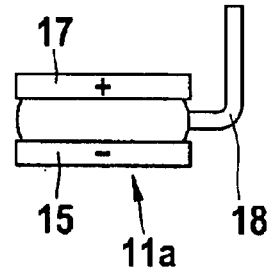

As shown in FIG. 2, the rectifier assembly 11 is a compact, replaceable diode module 11a, in which case the positive pole is configured as positive connecting plate 17, and the negative pole is configured as negative connecting plate 15, which said connecting plates are composed of aluminium or another material that conducts heat and electricity well. In the longitudinal sectional view in FIG. 2a, it is further shown that the negative diode 14 and positive diode 16 of each diode bridge 13 are composed of semiconductor substrates that, together with the connecting piece 18 located between each one, form three adjacently arranged stacks 19 that are located between the negative connecting plate 15 and the positive connecting plate 17. The stacks 19 are embedded in an insulating material between their connecting plates 15, 17. In the side view according to FIG. 2b, it is shown that the adjacently arranged connecting pieces 18 extend out of a longitudinal side of the diode module 11a and are angled upward for connection to the stator winding.

Figure 3:
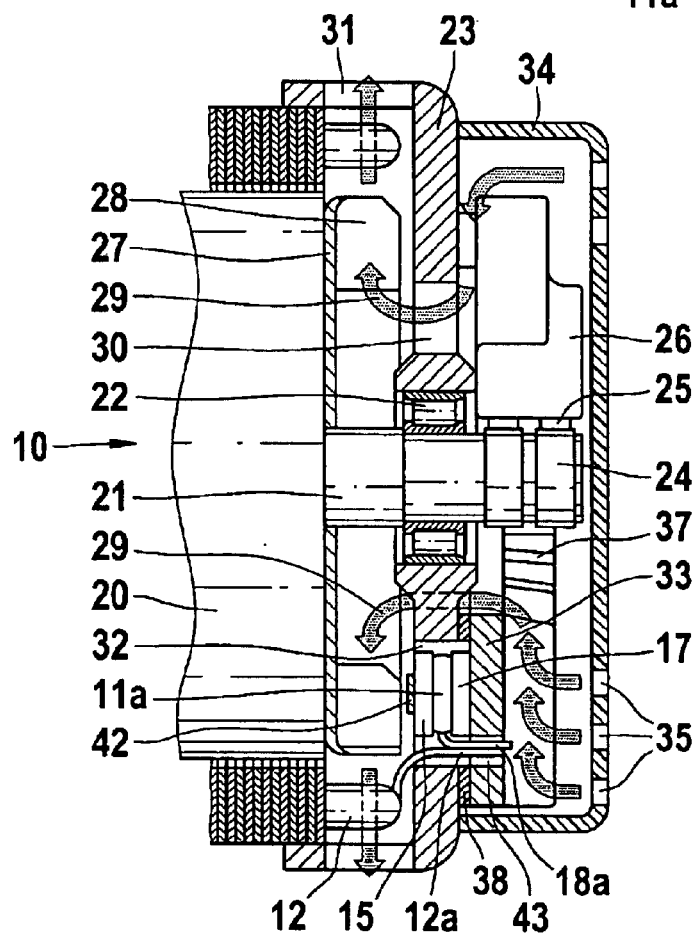
FIG. 3 is a longitudinal section drawing through the rear region of the alternator with end shield, diode module, cooling body and protective cap as the first exemplary embodiment.

FIG. 3 is a longitudinal sectional view of the rear end of the alternator 10, the claw pole-rotor 20 of which is mounted with its rotor shaft 21 in a bearing 22 on the rear end shield 23 of the machine. A slip-ring arrangement 24 is mounted on the end of the rotor shaft 21 extending out of the end shield 23. The not-shown excitation winding of the claw-pole rotor 20 is supplied with excitation current, via the slip-ring arrangement 24, by carbon brushes 25 of a brush holder 26 secured to the front face of the end shield 23. A fan 27 is mounted on the rear end face of the claw-pole rotor 20, the fan vanes 28 of which are configured in such a fashion that a stream of cooling air 29 produced by said fan vanes is drawn in through orifices 30 in the vicinity of end shield 23 near the shaft and, from there, is transported radially outwardly via the fan vanes 28, whereby the cooling air swirls around the stator winding 12 at its rear winding head, and subsequently flows outwardly through ventilation slots 31 on the outer circumference of the end shield 23. The rear end shield 23 is further equipped with an opening 32 on its front face in a region that is further from the shaft relative to the orifices 30, in which said opening the diode module 11a in FIG. 2 is located. The diode module 11a is connected in an electrically and thermally conductive manner with a cooling body 33 by its positive connecting plate 17 by the fact that the positive connecting plate 17 is permanently welded, screwed or riveted to the cooling body 33 in two dimensions. The negative connecting plate 15 of the diode module 11a is located in the opening 32 of the end shield 23 closely in front of the circulating fan vanes 28. The outside of this connecting plate 15 facing away from the cooling body 33 coincides with the inside of the end shield 23, so that a large area of it is exposed to the cooling air flow 29. Brush holder 26, slip-ring arrangement 24 and cooling body 33 are covered by a protective cap 34 mounted on a front face of the end shield 23, which said protective cap comprises air intake openings 35 distributed in its region far from the shaft.

Figure 4:
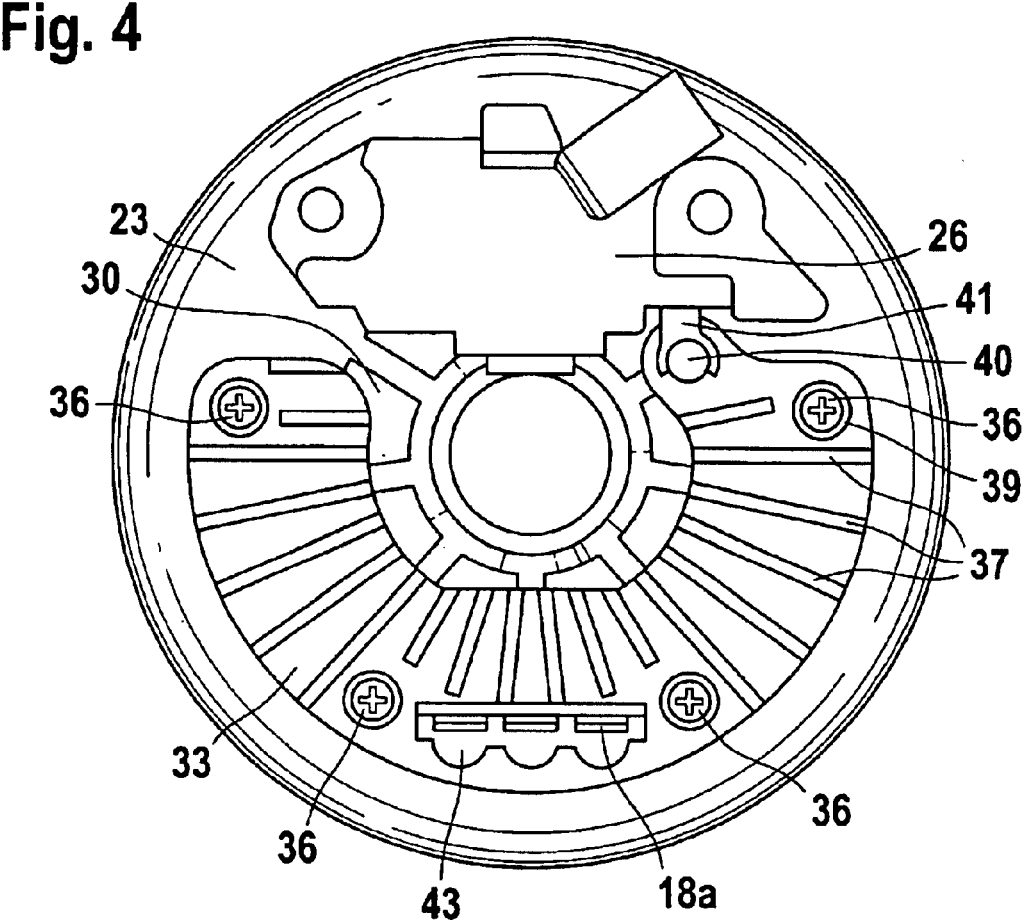
FIG. 4 is the top view of the alternator according to FIG. 3 with the protective cap removed.

FIG. 4 is a front view of the end shield 23 with the brush holder 26 and the cooling body 33 with the protective cap 34 removed. The cooling body 33 is configured semicircular in shape and screwed into a fixed position on the front face of the end shield 23 from the exterior using four screws 36. The cooling body 33 is provided with adjacently arranged, radially extending cooling fins 37 on its exterior side furthest from the diode module 11a.

FIG. 3 clearly shows that a few of the air intake openings 35 of the protective cap 34 are located above the cooling body 33, so that the cooling air drawn in there by the fan 27 when the machine operates first flows from the exterior over the cooling body 33 radially inwardly, then it enters the machine through the orifices 30 in the end shield 23 located in the vicinity of the shaft and, from here, having reached the fan 27, it flows through the rotating fan vanes 28 radially outwardly past the negative connecting plate 15 of the diode module 11a.

Since the cooling body 33 carries the positive potential of the positive connecting plate 17 in this exemplary embodiment, it is mounted on the end shield 23 with an electrically insulating intermediate layer 38. The intermediate layer 38 shown in FIG. 3 can be an insulator plate or a plastic film. In order to insulate the fastening screws 36 from the positive potential of the cooling body 33 as well, said fastening screws are inserted with insulating sleeves 39 in mounting holes of the cooling body 33, as shown in FIG. 4. Furthermore, the cooling body 33 is equipped with a positive terminal 40, to which a connection 41 of the brush holder 26 is also clamped.

Figure 5:
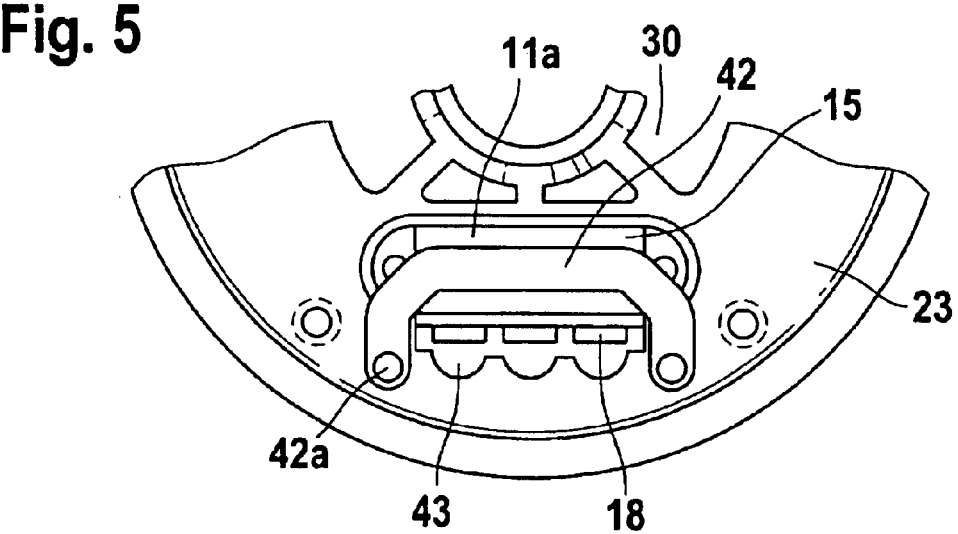
FIG. 5 is the back view of a part of the end shield.

In order to connect the negative connecting plate 15 of the diode module 11a to ground potential of the end shield 23, the negative connecting plate 15 of the diode module 11a is connected with a bus bar 42 in two dimensions on the inside of the end shield 23, as shown in FIG. 5. The bus bar 42 extends across the opening 32 on the inside of the end shield 23 and is fastened by its ends 42a to the end shield 23, that is, it is screwed into a fixed position, riveted or welded. FIGS. 3 and 4 also show that the cooling body 33 is provided with a recess 43 on the longitudinal side of the diode module 11a in the region of the connecting pieces 18, through which said recess the angled regions of the connecting pieces 18 extend outwardly with their end sections 18a to enable a direct connection of the winding ends 12a of the stator winding 12, in order to simplify welding the winding ends 12a to the connecting pieces 18 from the exterior.

Figure 6:
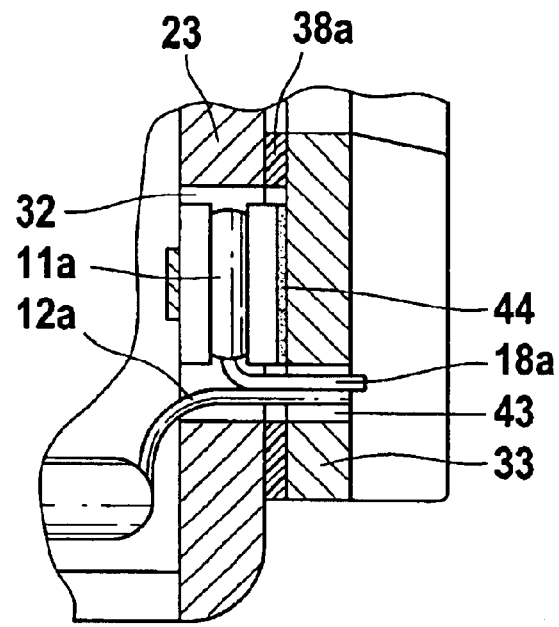
FIG. 6 is a cross-sectional view of part of the end shield with thermally conductive intermediate layer between cooling body and diode module and/or end shield as the second exemplary embodiment.

A second exemplary embodiment is shown in FIG. 6 as an alternative means of attaining the object of the invention compared with the embodiment according to FIG. 3. In this case, the cooling body 33 is mounted on the end shield 23 via a thermally conductive but electrically insulating intermediate layer 38a, so that a portion of the dissipated heat from the diode module 11a reaching the cooling body 33 also reaches the end shield 23—that forms a heat sink—via said intermediate layer 38a. Additionally, the positive connecting plate 17 is mounted there via an electrically and thermally conductive intermediate layer 44 on the cooling body 33, whereby the thermally conductive intermediate layer 44 can be a paste, an adhesive or a wax, among other things.

Figure 7:
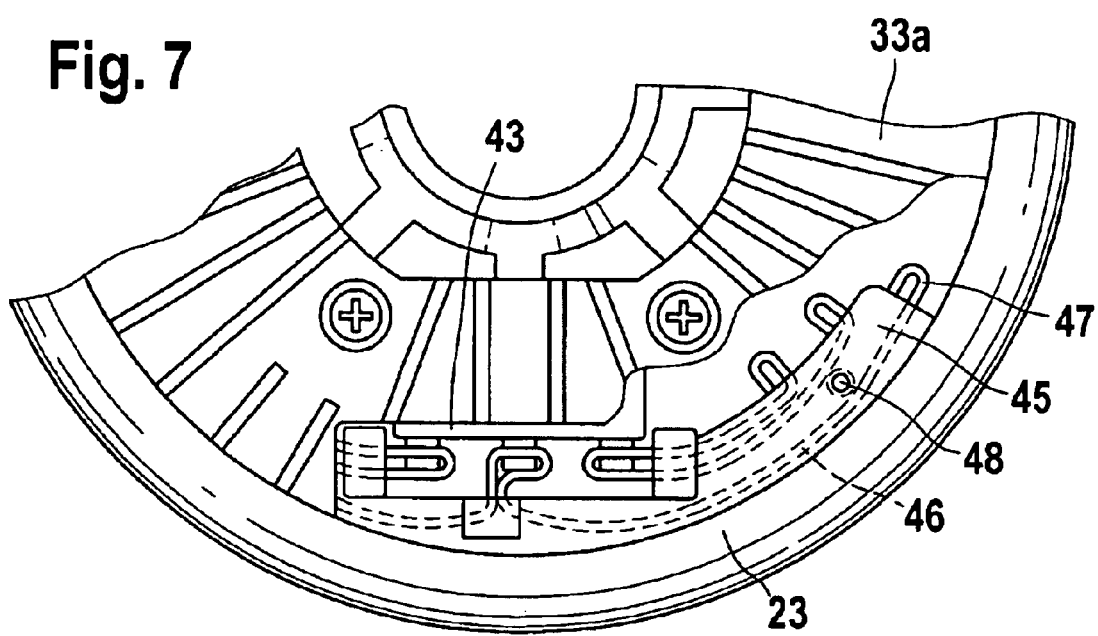
FIG. 7 is a top view of part of the end shield with part of the cooling body and a connecting plate located underneath it, as the third exemplary embodiment.

FIG. 7 shows, in a third exemplary embodiment of the invention, a top view of part of the rear end shield 23 of the machine with the cooling body 33a. An electrical connector 45 that is inserted between the region of the cooling body 33a far from the shaft and the end shield 23 can be seen through a breakout in the cooling body 33a. Via said electrical connector 45, the winding ends 12a extending out of the rear winding head of the stator winding 12 are connected with the connecting pieces 18 of the diode module 11a, and they are connected to form a neutral point, by means of connecting conductors 46. As shown using dashed lines, the connecting conductors 46—except for their contact loops 47—are embedded in known fashion in the insulating material of the electrical connector 45. The electrical connector 45 is fixed to the front face of the end shield 23 from the exterior via screwed connections 48.

Figure 8:
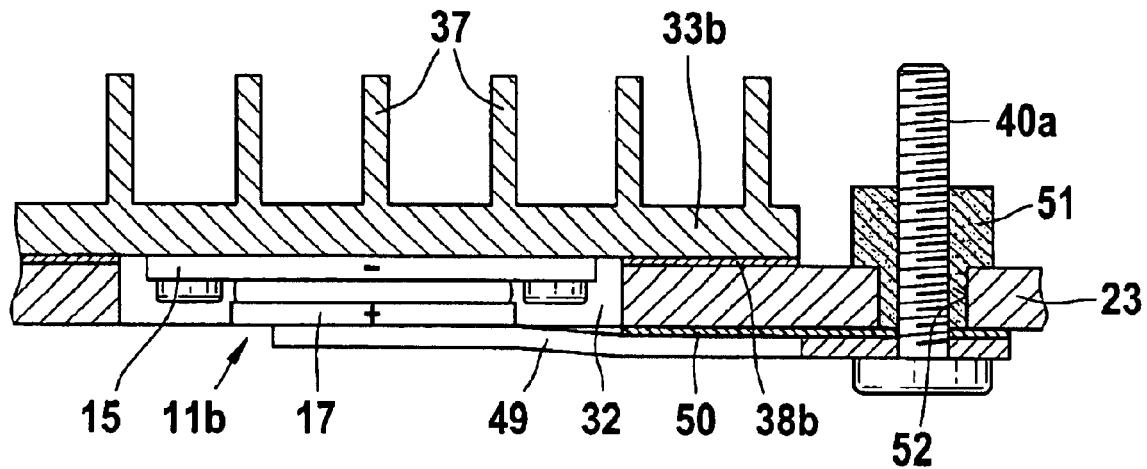
FIG. 8 is an enlarged cross-sectional view of part of the end shield with a cooling body fixed to the end shield in an electrically and thermally conductive manner, as the fourth exemplary embodiment.

FIG. 8, as the fourth exemplary embodiment of the invention, shows an enlarged view of of the breakout of the end shield 23 as a cross section, in which the diode module 11b is mounted on the cooling body 33b in two dimensions by its negative connecting plate 15. Since the cooling body 33b now carries ground potential just like the end shield 23, the cooling body 33b is now mounted directly on the end shield 23 in an electrically and thermally conductive manner. A portion of the dissipated heat from the diode module 11b taken up by the cooling body 33b will flow into the end shield 23 acting as a heat sink. In order to increase this portion when necessary, the cooling body 33b is mounted in two dimensions via an electrically and thermally conductive intermediate layer 38b, as shown in FIG. 8. Since the positive connecting plate 17 that carries the positive potential is now located on the inside of the end shield 23 in its opening 32, the positive connecting plate 17 is now equipped with a connecting piece 49 that leads to a positive terminal clamp 40a mounted on the end shield 23 in an electrically insulated manner. The connecting piece 49 is insulated from the end shield by means of a plate of insulating material 50, and the terminal screw 40a of the positive terminal clamp 40 is secured in an insulated manner in a connecting bore 52 of the end shield 23 by means of a ceramic bushing 51.

Figure 9:
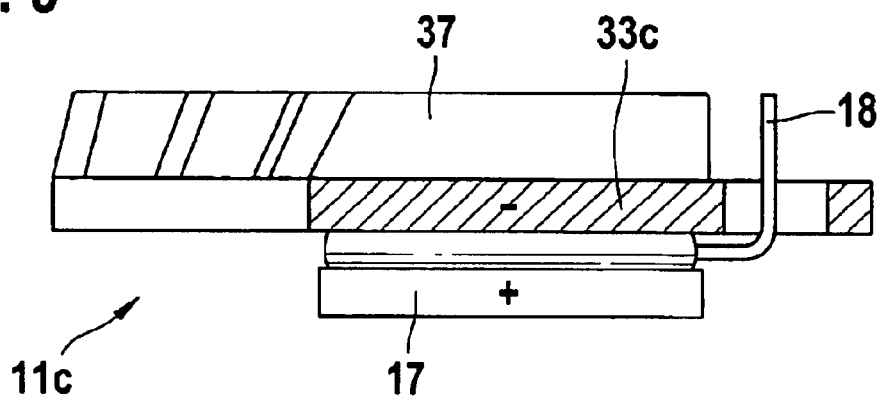
FIG. 9 is an enlarged cross-sectional view of part of the end shield with the cooling body as connecting plate of the rectifier assembly, as the fifth exemplary embodiment.

In an alternative embodiment of the rectifier assembly, the cooling body is an integral component of the positive and/or negative connecting plate of the rectifier assembly. A means of this nature for attaining the object of the invention is shown in FIG. 9, in which the cooling body 33c simultaneously serves as the negative connecting plate of the rectifier assembly 11c. With the means of this nature for attaining the object of the invention, the number of components is reduced by the maximum, and the installation height of the rectifier assembly is minimal. Additionally, this means of attaining the object of the invention is particularly vibration-resistant, since a diode module need not be mounted on the cooling body.

All of the exemplary embodiments have one thing in common, namely, the novel guidance of the cooling air flow to evacuate the dissipated heat in the rectifier assembly, in which a majority of the cooling air drawn in by the fan 27 is first guided past the exterior side of the end shield 23, so that it then flows on the inside of the end shield 23 with high speed in the region of the fan vanes 28 via the connecting plate 15 and 17 located there in the opening 32 of the end shield 23. This results in a particularly favorable heat-transfer coefficient. The cooling of the negative connecting plate 15 of the diode module 11a by means of its ground connection to the end shield 23 as heat sink can be enhanced even further by configuring the bus bar 42 with adequately large dimensions.

What is claimed is:

1. An electrical machine, preferably an alternator for motor vehicles, comprising a rectifier assembly (11a) that is fixed to an end shield (23) of the machine, said rectifier assembly being cooled by a fan (27) that operates in the end shield and that is connected on the one hand with a direct-current output (15, 17) and, on the other hand, with a stator winding (12) of the electrical machine (10) that carries a polyphase alternating voltage, whereby a plurality of diode bridges (19) is positioned, each composed of two diodes connected in series with the anode of their negative diode (14) on a common negative connecting plate (15) end with the cathode of their positive diode (16) on a common positive connecting plate (17) of the rectifier assembly (11), wherein the rectifier assembly (11) is located in an opening in the front face (32) of the end shield (23) in a region further from the shaft, and said rectifier assembly is connected in an electrically and thermally conductive manner by one of said connecting plates (15 and 17) to a cooling body (33) that is connected to the exterior of the end shield (23) and covers the opening (32) at least to the extent that cooling air (29) drawn in by the fan (27) first flows from the exterior across the cooling body (33) in an at least approximately radial manner towards the interior, entering the machine (10) in the vicinity of the shaft through orifices (30) in the end shield (23) and from here, having reached the fan (27), subsequently flows past the other connecting plate (15 and 17) of the rectifier assembly (11) that is located in the opening in the front face (32) in an at least approximately radial manner towards the exterior.

2. The electrical machine according to claim 1, wherein the rectifier assembly (11) forms a compact diode module (11a) by the fact that the negative and plus diodes (14, 16) of each diode bridge (13) are composed of semiconductor substrates that, together with a connecting piece (18) inserted therebetween, form a stack (19) that is located between the positive and negative connecting plates (15, 17).

3. The electrical machine according to claim 1, wherein the stacks (19) between the connecting plates (15, 17) are located adjacent to each other, and their connecting pieces (18) extend adjacently outward on a longitudinal side of the diode module (11a) for connection to the stator winding (12).

4. The electrical machine according to claim 3, wherein the connecting pieces (18) are angled on the longitudinal side of the diode module (11a), and the end sections (18a) of said connecting pieces extend outwardly in a recess (43) of the cooling body (33) for connection to the stator winding (12).

5. The electrical machine according to claim 1, wherein the cooling body (33) is configured semicircular in shape and is screwed into a fixed position from the exterior on the front face of the end shield (23).

6. The electrical machine according to claim 5, wherein the cooling body (33) is equipped with adjacently arranged, radially extending cooling fins (37) on the exterior side furthest from the diode module (11a).

7. The electrical machine according to claim 1, wherein a protective cap (34) that covers the front face of the end shield (23) comprises a plurality of air intake openings (35), at least above the cooling body (33).

8. The electrical machine according to claim 1, wherein the cooling body (33b) is an integral component of the positive or the negative connecting plate (17 and/or 15) of the rectifier assembly (11c).

9. The electrical machine according to claim 5, wherein the stator winding (12) and the connecting pieces (18) of the diode module (11a) are interconnected via an electrical connector (45) containing the corresponding connecting conductors (46).

10. The electrical machine according to claim 9, wherein the electrical connector (45) is inserted between the cooling body (33a) and the end shield (23).

11. The electrical machine according to claim 1, wherein the rectifier assembly (11) is fixed to the cooling body (33) in two dimensions by the exterior of its positive connecting plate (17), and the cooling body (33) is equipped with a positive terminal (40).

12. The electrical machine according to claim 11, wherein the cooling body (33) is fixed to the end shield (23) via an electrically insulating intermediate layer (38).

13. The electrical machine according to claim 12, wherein the cooling body (33) is fixed to the end shield (23) via an electrically insulating, thermally conductive intermediate layer (38a).

14. The electrical machine according to claim 12, wherein insulating sleeves (39) are inserted in mounting holes of the cooling body (33) that accommodate fastening screws (36) of the cooling body (33).

15. The electrical machine according to claim 11, wherein the exterior side of the negative connecting plate (15) of the rectifier assembly (10) is connected with a bus bar (42) in two dimensions, which said bus bar, as ground connection, extends across the opening (32) on the inside of the end shield (23), and is fixed to the end shield (23) by its ends (42a).

16. The electrical machine according to claim 1, wherein the rectifier assembly (11b) is connected in two dimensions to the cooling body (33b) by the outside of its negative connecting plate (15), said cooling body being fixed to the end shield (23) in an electrically and thermally conductive manner.

17. The electrical machine according to claim 16, wherein the cooling body (33b) rests on the end shield (23) in two dimensions, preferably over an electrically and thermally conductive intermediate layer (38b).

18. The electrical machine according to claim 16, wherein the positive connecting plate (17) of the rectifier assembly (11c) is equipped with a connecting piece (49) that leads to a positive terminal (40a) fixed to the end shield (23) in an electrically insulated manner.

19. The electrical machine according to claim 1, wherein the outside of the connecting plate (15 and 17) furthest from the cooling body (33) at least approximately coincides with the inside of the end shield (23) in the region of the opening in the front face (32).

* * * * *